United States Patent
Kondo et al.

(10) Patent No.: US 11,617,990 B2
(45) Date of Patent: Apr. 4, 2023

(54) POROUS CARBON FIBER AND FLUID SEPARATION MEMBRANE

(71) Applicant: TORAY INDUSTRIES, INC., Tokyo (JP)

(72) Inventors: Dai Kondo, Otsu (JP); Takaaki Mihara, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 175 days.

(21) Appl. No.: 17/298,371

(22) PCT Filed: Jan. 30, 2020

(86) PCT No.: PCT/JP2020/003339
§ 371 (c)(1),
(2) Date: May 28, 2021

(87) PCT Pub. No.: WO2020/158845
PCT Pub. Date: Aug. 6, 2020

(65) Prior Publication Data
US 2022/0001338 A1    Jan. 6, 2022

(30) Foreign Application Priority Data

Feb. 1, 2019 (JP) .............................. JP2019-016801

(51) Int. Cl.
*B01D 69/08* (2006.01)
*D01D 5/247* (2006.01)
(Continued)

(52) U.S. Cl.
CPC ............ *B01D 69/08* (2013.01); *D01D 5/247* (2013.01); *D01F 6/54* (2013.01); *D01F 6/56* (2013.01);
(Continued)

(58) Field of Classification Search
CPC ................ B01D 69/08; B01D 2323/30; B01D 67/0067; B01D 69/02; B01D 71/021;
(Continued)

(56) References Cited

U.S. PATENT DOCUMENTS

| 2001/0024722 A1 | 9/2001 | Matsuhisa et al. |
| 2008/0118427 A1 | 5/2008 | Leon y Leon |
| 2017/0327974 A1 | 11/2017 | Zushi et al. |

FOREIGN PATENT DOCUMENTS

| JP | 2010-510406 A | 4/2010 |
| JP | 2011-26758 A | 2/2011 |

(Continued)

OTHER PUBLICATIONS

NONE—(Year: 2022).*
(Continued)

*Primary Examiner* — Daniel C. McCracken
(74) *Attorney, Agent, or Firm* — Birch, Stewart, Kolasch & Birch, LLP (57) ABSTRACT

The present invention provides a porous carbon fiber which has an excellent permeation amount and excellent pressure resistance, which is prevented from the occurrence of detachment or cracking at an interface, and which can exhibit excellent properties needed for use as a support for a fluid separation membrane. The present invention is a porous carbon fiber having a bicontinuous porous structure, wherein
the average value $R_{ave}$ of the R value of the outer surface and the R value of the inside is 1.0 or more and 1.8 or less,
the absolute value $\Delta R$ of the difference between the R value of the outer surface and the R value of the inside is 0.05 or less, and
R value is a carbonization progression degree calculated from a Raman spectrum in accordance with the following formula:

$R$ value=(intensity of scattering spectrum at 1360 cm$^{-1}$)/(intensity of scattering spectrum at 1600 cm$^{-1}$).

11 Claims, 2 Drawing Sheets

(51) Int. Cl.
  *D01F 6/54*    (2006.01)
  *D01F 6/56*    (2006.01)
  *D01F 9/22*    (2006.01)
  *D01F 9/24*    (2006.01)
  *B82Y 30/00*   (2011.01)
  *B82Y 40/00*   (2011.01)

(52) U.S. Cl.
  CPC ............... *D01F 9/225* (2013.01); *D01F 9/24* (2013.01); *B82Y 30/00* (2013.01); *B82Y 40/00* (2013.01); *C01P 2004/10* (2013.01); *C01P 2004/64* (2013.01); *C01P 2006/16* (2013.01)

(58) Field of Classification Search
  CPC .. D01D 5/247; D01D 5/24; D01F 6/54; D01F 6/56; D01F 9/225; D01F 9/24; D01F 6/74; D01F 9/21; B82Y 30/00; B82Y 40/00; C01P 2004/10; C01P 2004/64; C01P 2006/16; C01P 2004/61; C01B 32/00

See application file for complete search history.

(56) References Cited

FOREIGN PATENT DOCUMENTS

| | | |
|---|---|---|
| JP | 2018-142461 A | 9/2018 |
| WO | WO 97/45576 A1 | 12/1997 |
| WO | WO 2015/152019 A1 | 10/2015 |
| WO | WO 2019/021963 A1 | 1/2019 |

OTHER PUBLICATIONS

International Search Report, issued in PCT/JP2020/003339, PCT/ISA/210, dated Apr. 14, 2020.
Written Opinion of the International Searching Authority, issued in PCT/JP2020/003339, PCT/ISA/237, dated Apr. 14, 2020.

\* cited by examiner

POROUS CARBON FIBER AND FLUID SEPARATION MEMBRANE

TECHNICAL FIELD

The present invention relates to a porous carbon fiber, which is mainly used for a support for a fluid separation membrane that is utilized to separate a fluid such as gas and liquid.

BACKGROUND ART

A fiber having a porous structure is utilized as a support for a fluid separation membrane in recent years. For example, there has been fabricated a gas separation membrane including a separation functional layer made from carbon created on a porous fiber surface, for example, by carbonizing phenol resin or polyimide as a carbon film precursor applied on tubular or monolithic ceramic porous support surface, in an oxygen-free atmosphere (Patent Documents 1 and 2). However, there are such problems that the ceramic support is expensive to produce due to its complicated manufacturing process, and that the ceramic support has poor flexibility and is easily breakable, and the like.

In order to solve these problems, there has been proposed a fluid separation membrane including a support made of carbon fiber having a porous structure (Patent Documents 3 and 4).

PRIOR ART DOCUMENTS

Patent Documents

Patent Document 1: WO 2011/118469 A
Patent Document 2: JP H8-299769 A
Patent Document 3: JP H2-160924 A
Patent Document 4: WO 2017/126501 A

SUMMARY OF THE INVENTION

Problems to be Solved by the Invention

In utilization of the porous carbon fiber as described in Patent Documents 3 and 4 for a support of fluid separation membrane, an enlargement of the pore diameter of the porous structure and/or a provision of a hollow part in order to increase a fluid permeation amount would compromise the pressure resistance, and thus, the fluid separation membrane thickness needed to be increased by enlargement of the fiber diameter and the hollow fiber membrane thickness as well so as to secure the pressure resistance. However, according to the investigation made by the present inventors, there has been a problem that the increased membrane thickness would likely to cause detachment and cracking, resulting in the compromised mechanical strength.

An object of the present invention is to provide a porous carbon fiber which has an excellent permeation amount and an excellent pressure resistance, which is prevented from the occurrence of detachment or cracking at an interface, and which has excellent properties needed for use as a support for a fluid separation membrane.

Solutions to the Problems

It has inferred based on the investigation made by the present inventors that the increased membrane thickness would produce a difference in the carbonization progression degree between the inside and the outer surface of the porous carbon fiber, and the increased difference would cause detachment or cracking at the interface thereof. The present invention solves this problem by controlling the difference in the carbonization progression degree between the inside and the outer surface of the porous carbon fiber as small as possible.

In the other words, the present invention for solving the above-mentioned problems is a porous carbon fiber having a bicontinuous porous structure, in which the average value $R_{ave}$ of the R value of the outer surface and the R value of the inside is 1.0 or more and 1.8 or less, and the absolute value $\Delta R$ of the difference between the R value of the outer surface and the R value of the inside is 0.05 or less. The R value will be described later.

Effects of the Invention

According to the present invention, there can be provided a porous carbon fiber having an excellent permeation amount and an excellent pressure resistance, and which is prevented from the occurrence of detachment or cracking at an interface. In addition, there can be fabricated a fluid separation membrane having an excellent durability by using the porous carbon fiber of the present invention as a support.

EMBODIMENTS OF THE INVENTION

The porous carbon fiber of the present invention is defined by an R value that is an index representing a carbonization progression degree, and that is calculated in accordance with the following formula from a Raman spectrum.

R value=(intensity of scattering spectrum at 1360 $cm^{-1}$)/(intensity of scattering spectrum at 1600 $cm^{-1}$)

In the porous carbon fiber of the present invention, the average value $R_{ave}$ of the R value of the outer surface and the R value of the inside is 1.0 or more and 1.8 or less, and the absolute value $\Delta R$ of the difference between the R value of the outer surface and the R value of the inside is 0.05 or less.

Figure 1:
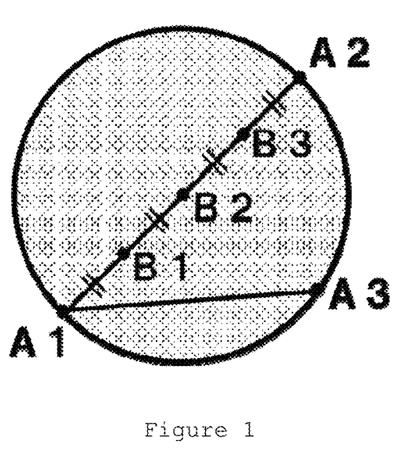
FIG. 1 is an illustration of the R value of the inside of a porous carbon fiber (solid fiber).

In the above formula, the R value of the outer surface of the porous carbon fiber will be the average value of R values for any five points that lie on the outer surface of the porous carbon fiber. The R value of the inside of the porous carbon fiber will be explained with reference to FIG. 1. For a porous carbon fiber as a solid fiber, the R value is the largest R value among the R values for three points (B1, B2, B3) that quarter the straight line segment A1A2 connecting two points (A1, A2) that lie on the outer surface and that form the largest distance in the cross section of the split porous carbon fiber. Thus, the lengths of the line segment A1B1, the line segment B1B2, the line segment B2B3, and the line segment B3A2 are the same. Note that, two points A1 and A3 are the two points that lie on the outer surface but that do not form the largest distance.

Figure 2:
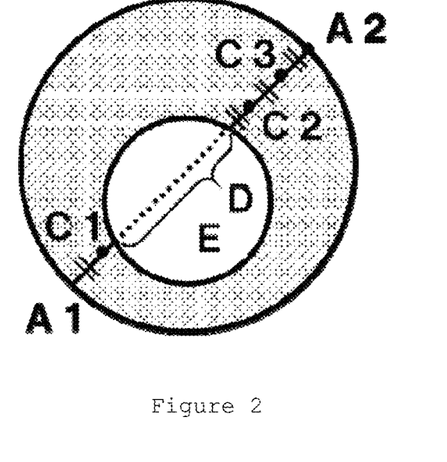
FIG. 2 is an illustration of the R value of the inside of a porous carbon fiber (hollow fiber).

The explanation for a porous carbon fiber as a hollow fiber will be made with reference to FIG. 2. The R value of the inside of the porous carbon fiber is the largest R value among the R values for three points (C1, C2, C3) quartering the straight line segment that is obtained by subtracting the portion D passing through the hollow part E from the straight line segment A1A2 that connects two points (A1, A2) that lie on the outer surface and that form the largest distance in the cross section of the split porous carbon fiber. That is, the lengths of the line segment A1C1, the line segment C1C2 excluding the portion D that passes through the hollow part E, the line segment C2C3, and the line segment C3A2 are the same.

The R value can be measured with use of Raman spectrometer. In the Raman spectra of carbon material, there generally observed the spectral peak of the G-band near 1600 cm$^{-1}$ originating from a graphite structure and the spectral peak of the D-band near 1360 cm$^{-1}$ originating from a defect. The larger ratio of the G-band spectral peak intensity to the D-band spectral peak intensity indicates that the graphite structure in the carbon material is more developed and hence the R value defined by the above formula is an indicator for carbonization progression degree. Note that, the R value of the porous carbon fiber can be measured by the method more specifically described in Examples set forth below.

The larger average value $R_{ave}$ of the R value of the outer surface and the R value of the inside indicates that the carbon network plane is less developed, and has a tendency to be more flexible and enhance fluid permeability. The carbon network plane refers to a plane of carbons mainly consisted of 6-membered ring of carbons such as that of graphite. Thus, the larger the $R_{ave}$, the more susceptible to a change in ambient environment such as water adsorption or a temperature change, and thus a dimensional change is more likely to occur. On the other hand, the smaller $R_{ave}$ indicates that the carbon network plane is more developed, and has a tendency that the chemical resistance is enhanced and dimensional changes due to the change in ambient environment are less likely to occur. In order to produce a porous carbon fiber having an excellent flexibility as well as sufficient chemical resistance, the $R_{ave}$ needs to be 1.0 or more and 1.8 or less, more preferably 1.10 or more, and more preferably 1.70 or less.

The smaller absolute value ΔR of the difference between the R value of the outer surface and the R value of the inside means that the difference in the carbonization progression degree in the porous carbon fiber is smaller, and detachments and cracks are less likely to occur at the interface with different carbonization progression degree, and thus ΔR needs to be 0.05 or less, and more preferably 0.03 or less.

The precursor for the porous carbon fiber of the present invention is preferably polyacrylonitrile or an aromatic polyimide. When the precursor includes these resins, the porous carbon fiber has an excellent fluid permeation rate and an excellent separation factor. In addition, the porous carbon fiber using polyacrylonitrile as its precursor can be manufactured at low cost and in which a defect is less likely to occur, and thus is a particularly preferable embodiment.

Confirmation that polyacrylonitrile or an aromatic polyimide is used as the porous carbon fiber precursor is made by conducting the surface analysis of the porous carbon fiber for its nitrogen element content with use of X-ray Photoelectron Spectroscopy (XPS), Time-of-flight secondary ion mass spectrometry (TOF-SIMS), Scanning Electron Microscope-Energy Dispersive X-Ray Spectroscopy (SEM-EDX), or the like. Confirmation that the precursor composition is polyacrylonitrile is also made, based on the observation of a peak at an energy position of 398.4 eV (±0.5 eV) for N1s inner shell spectrum in the spectra calibrated to the standard energy of 284.6 eV for the C1s peak, and on that nitrogen concentration (N/C ratio: the number of nitrogen atoms/the number of carbon atoms) is in the range of 0.05 or more and 0.25 or less in the measurement for the surface of the dense carbon layer with use of X-ray Photoelectron Spectroscopy (XPS).

Incidentally, the peak at 398.4 eV of the N1s inner shell spectrum is the peak attributed to a carbon-nitrogen double bond or triple bond.

Figure 3:
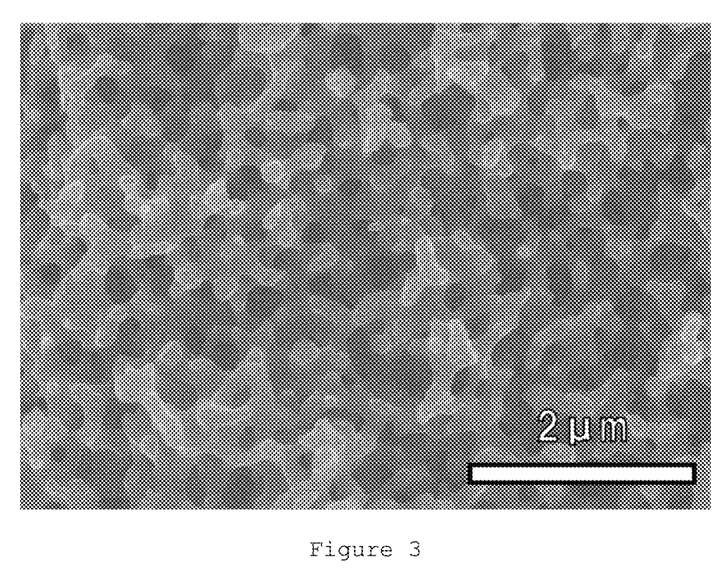
FIG. 3 is a scanning electron micrograph for a bicontinuous structure of a porous carbon fiber.

The porous carbon fiber of the present invention has a bicontinuous porous structure. The term "bicontinuous porous structure" refers to a structure in which branches of carbon skeletons and pores (voids) are continuously and three dimensionally entwined each other. As specifically illustrated in FIG. 3, it can be confirmed based on the observation of the appearance in which the branches of the carbon skeleton and the voids that are continuously entwined each other in scanning electron microscopic observation on the cross section of a sample that is sufficiently cooled down in liquid nitrogen and then split with tweezers or the like. The wording "the porous carbon fiber has the bicontinuous porous structure" means that there can be observed such a bicontinuous porous structure in any cross section of the porous carbon fiber.

In the porous carbon fiber having the bicontinuous porous structure, the three-dimensionally continuous carbon skeletons produce an effect that the carbon skeletons support the entire structure, which allows the stress to be distributed throughout the porous carbon fibers, and hence, the porous carbon fiber gains high resistance against an external force such as compression and bending. That is, the porous carbon fiber having the bicontinuous porous structure has high compressive strength and high specific compressive strength. In addition, the voids are also communicated three-dimensionally with each other, and thus can act as a flow path for a fluid such as a gas or a liquid.

Examples of embodiments of the bicontinuous porous structure include, but are not particularly limited to, a lattice shape and a monolithic shape. In view of providing the above-mentioned effect, the monolithic shape is preferable as it has a tendency to enhance the compressive strength in the fiber cross-sectional direction. The term "monolithic shape" refers to a form in which the carbon skeletons make up three-dimensionally uniform and continuous structure in the bicontinuous porous structure. The monolithic shape is distinguished from a structure in which individual particles are aggregated and/or linked; or on the contrary, an irregular structure such as those built up with the voids and its surrounding skeletons that are formed after the removal of aggregated and/or linked template particles; or a structure in which biologically originated cell walls are in succession.

In a preferred embodiment, the bicontinuous porous structure of the porous carbon fiber of the present invention has a structural period, and the structural period in this embodiment is preferably 0.002 μm or more and 20 μm or less. The presence of the structural period in the porous carbon fiber indicates that the bicontinuous porous structure has high uniformity, and means that the thickness of the carbon skeleton branch and the pore size are uniform. As a result, an effect to enhance the compressive strength of the fluid separation membrane is produced. The smaller the structural period, the finer the carbon skeleton structure and the pore, and thereby the compressive strength is enhanced. For these reasons, the structural period is more preferably 10 µm or less, and further preferably 5 µm or less. On the other hand, the larger the structural period, the smaller the pressure loss at the time when a fluid flows through the void, and thereby the fluid permeation rate is increased. In addition, the smaller pressure loss, the higher energy saving effect produced in separation and purification. For these reasons, the structural period is more preferably 0.02 µm or more, and further preferably 0.1 µm or more.

The structural period of the bicontinuous porous structure is calculated according to the following formula using the scattering angle 2θ corresponding to the position of a peak top of scattering intensity obtained by small-angle scattering of X-rays incident on the porous support.

$L=\lambda/(2\sin\theta)$

L: Structural period, λ: Wavelength of incident X-rays.

However, too large structural period may not be observable with small-angle X-ray scattering. In that case, the structural period is determined with use of X-ray computed tomography (X-ray CT). Specifically, a three-dimensional image captured by X-ray CT is converted to two-dimensional spectra with use of the Fourier transform, and then the two-dimensional spectra are circular averaged to give one-dimensional spectra. The characteristic wavelength corresponding to the peak top position is determined in the one-dimensional spectra, and the structural period is calculated as the reciprocal of the characteristic wavelength.

When overall average diameter of entire pores that create the bicontinuous porous structure of the porous carbon fibers is too small, pressure loss increases and thus fluid permeation amount decreases. Therefore, the overall average diameter of the entire pores is preferably 30 nm or more, and more preferably 100 nm or more. On the other hand, when the overall average diameter of the entire pores is too large, the effect that the carbon branches support the entire structure is reduced and thus the compressive strength is decreased. For this reason, the overall average diameter of the entire pores is preferably 5,000 nm or less, and more preferably 2,500 nm or less.

As used herein, the overall average diameter of the entire pores is a measured value based on the measurement for pore diameter distribution using the mercury porosimetry. The mercury porosimetry is used to determine pore volume and specific surface area based on the pressure that is applied to intrude mercury into the pores of the bicontinuous porous structure and the amount of mercury intruded into the pore. Then, assuming that the pore is cylindrical, the pore diameter is calculated based on the relationship between the pore volume and the specific surface area.

When the porous carbon fiber of the present invention is used as a porous support to create a separation membrane, it is preferable that the bicontinuous porous structure has the opening of pores on the outer surface of the porous carbon fiber, that is, the side of the interface with a separation functional layer when the porous structure is used as a support for the fluid separation membrane. The presence of the opening of pores on the outer surface of the bicontinuous porous structure can be verified based on the confirmation of the presence of the bicontinuous porous structure according to the aforementioned procedure, and on the observation of recesses that originate from the pores on the outer edge of the porous carbon fiber under the electron microscopic observation on the porous support cross section fabricated by an ion milling machine or the like.

When the bicontinuous porous structure has the opening of pores at the interface with the separation functional layer, the pressure loss is reduced at the time when fluid permeates from the separation functional layer to the porous carbon fiber or vice versa, and thus the fluid permeation rate through the fluid separation membrane can be enhanced. Furthermore, an unevenness is created on the outer surface of the porous carbon fiber and thereby the adhesion to the separation functional layer is enhanced by anchor effect, and detachment during use is prevented and thus a fluid separation membrane with excellent durability can be obtained.

The larger the opening diameter of the pore at the interface with the separation functional layer, the higher the gas permeation rate through the fluid separation membrane. For this reason, the average opening diameter of the pore on the outer surface is preferably 2 nm or more, more preferably 10 nm or more, and even more preferably 50 nm or more. On the other hand, when the average opening diameter of the pore is too large, at the time of creating the separation functional layer, an inorganic material or an organic material may penetrate deep inside the porous support and may not be stacked uniformly on the surface. For this reason, the average opening diameter of pores on the outer surface is preferably 5000 nm or less, more preferably 2500 nm or less, and even more preferably 1000 nm or less.

The average opening diameter of the pore on the outer surface is calculated as follows: the length from one contact point of a carbon with the interface to another contact point is measured along the interface at arbitrary 10 locations in the interface portion where the interface is in direct contact with the voids that are the pore portion of the porous support; and then the average pore diameter is calculated as the average of the lengths measured at the arbitrary 10 locations.

The porous carbon fiber with smaller diameter is preferable on the reasons that it is more flexible and less breakable, and that it can withstand higher pressure. The porous carbon fiber with larger diameter is preferable on the reasons that it is more excellent in mechanical strength and that fluid pressure loss can be further reduced. For these reasons, the fiber diameter of the porous carbon fiber is preferably in the range of 0.1 µm or more and 10,000 µm or less, more preferably 20 µm or more and 10,000 µm or less, and further preferably 20 µm or more and 5,000 µm or less. As used herein, the fiber diameter refers to the outer diameter as determined from the cross sectional area of the cross section created perpendicular to the fiber axis on the assumption that the cross-sectional area is that of a circle. When the fiber cross section has a hollow part, the fiber diameter shall be determined from the cross-sectional area including the cross-sectional area of the hollow part.

Figure 4:
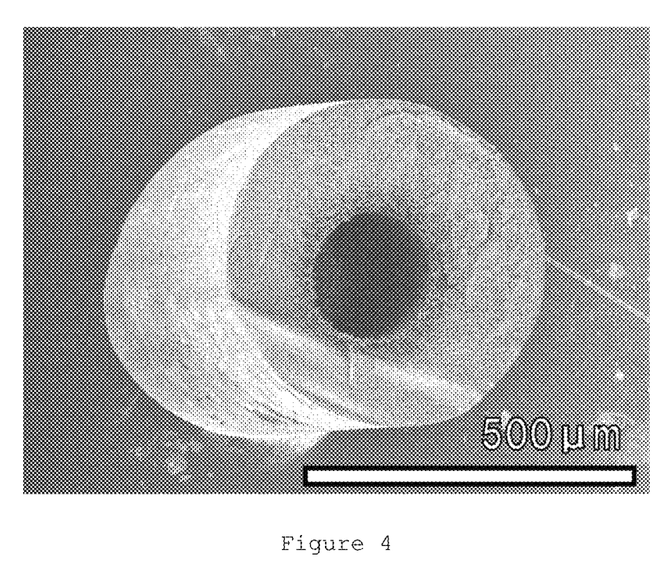
FIG. 4 is a scanning electron micrograph of a cross section of a porous carbon fiber.

The porous carbon fiber of the present invention may be a hollow fiber having a hollow part. It is specifically illustrated in FIG. 4. For a hollow fiber, the lower the hollow ratio, the more enhanced pressure resistance can be achieved, and the higher the hollow ratio, the smaller fluid pressure loss can be achieved. For these reasons, the hollow ratio is preferably in the range of 1% or more and 90% or less, and more preferably in the range of 5% or more and 60% or less.

The porous carbon fiber of the present invention can be used as a fluid separation membrane after creation of a separation functional layer made of an inorganic material or an organic material in stacked form on the surface of the porous carbon fiber which is used as a support. When the porous carbon fiber is a hollow fiber with a hollow part, a separation functional layer may be created on the inner surface. The wording of "create in stacked form" means to create a structure in which the porous carbon fiber and the separation functional layer are disposed with a definite interface between them so as to cover the surface of the porous support.

Examples of the inorganic materials include, but are not particularly limited to, carbon materials; metals such as Pd, V, Pt, Nb, T, PdAg, PdCu, and NiZr; and ceramics made by heating and then sintering an inorganic compound such as an oxide, a carbide, a nitride, or a boride.

Examples of the organic materials include, but are not particularly limited to, aromatic polyimide, cellulose acetate, polysulfone, aromatic polyamide, polyamideimide, polyetherimide, polyethersulfone, polyacrylonitrile, polyphenylene sulfide, polyether ether ketone, polytetrafluoroethylene, polyvinylidene fluoride, poly(1-trimethylsilylpropyne), polydimethylsiloxane, polyvinyltrimethylsilane, poly (4-methylpentene), ethyl cellulose, natural rubber, poly(2,6-dimethylphenylene oxide), low density polyethylene, high density polyethylene, styrene, polyethyl methacrylate, polycarbonate, polyester, aliphatic polyamide, polyvinyl alcohol, various types of polyethers such as polyethylene glycol, polymethacrylic acid, polymethylmethacrylate, various types of polymers of intrinsic microporosity (PIM), various types of thermally rearranged polymers (TR polymers), and copolymers thereof.

Note that, there may be some cases when the porous carbon fiber of the present invention as itself can be used as a fluid separation membrane, without further creating a separation functional layer on its surface. That is, a fluid separation membrane essentially made of the porous carbon fiber is also an embodiment of the present invention. For example, separation of viruses, bacteria, and the like contained in a liquid will be possible by adjusting the average opening diameter of pores on the outer surface to a separation target.

<Manufacturing Method of Porous Carbon Fiber>

By way of an example, the porous carbon fiber of the present invention can be manufactured by the manufacturing method including the steps of:

miscibilizing a carbonizable resin and an eliminable resin to give a resin mixture (step 1);

molding the resin mixture in miscibilized state into a fibrous form and separating the resin mixture into multiple phases (step 2);

removing the eliminable resin from the phase-separated resin mixture (step 3);

carbonizing the resin mixture through heating to obtain a porous carbon fiber (step 4); and polishing the surface of the porous carbon fiber (step 5).

[Step 1] Miscibilizing Mixing of Carbonizable Resin and Eliminable Resin.

Step 1 is a step of miscibilizing a carbonizable resin and an eliminable resin to give a resin mixture. As used herein, the term "carbonizable resin" refers to a resin that leaves branches (carbon skeleton) after carbonization through heating. Both of a thermoplastic resin and a thermosetting resin can be used for the carbonizable resin.

When a thermoplastic resin is used for the carbonizable resin, it is preferable to select a resin that can be infusibilized by a simple process such as heating or high energy ray irradiation. When a thermosetting resin is used for the carbonizable resin, many of them do not need to be infusibilized, and such thermosetting resin is also exemplified as a suitable material.

Examples of the thermoplastic resin include: polyphenylene ether, polyvinyl alcohol, polyacrylonitrile, phenol resin, total aromatic polyester, polyimide resin, cellulose acetate, and polyetherimide. Examples of the thermosetting resin include: unsaturated polyester resin, alkyd resin, melamine resin, urea resin, polyimide resin, diallyl phthalate resin, lignin resin, urethane resin, and polyfurfuryl alcohol resin. These may be used alone or in a mixed state thereof. In view of facilitating molding process, it is also preferable to mix thermoplastic resins with each other, or thermosetting resins with each other. Among them, in view of carbonization yield, spinnability, and economic performance, a thermoplastic resin is preferably used, and polyphenylene ether, polyvinyl alcohol, polyacrylonitrile, and total aromatic polyester are more preferably used.

The molecular weight of the carbonizable resin is preferably 10,000 or more in terms of weight average molecular weight. When the weight average molecular weight is 10,000 or more, yarn breakage in spinning process is reduced. On the other hand, the upper limit of the weight average molecular weight is not particularly limited, but is preferably 1,000,000 or less in view of spinnability/moldability and facilitation of the resin extrusion.

Note that, the term "eliminable resin" is a resin that can be removed at any stage after the creation of the phase-separated structure in step 2 described later.

The method to remove the eliminable resin is not particularly limited, and there can be preferably used a chemical removal method involving depolymerization with use of a chemical and the like, a dissolution removal method involving addition of a solvent which dissolves the eliminable resin, or a heat removal method involving thermal decomposition of the eliminable resin into smaller molecules. These methods can be conducted alone or in combination thereof. When conducted in combination, each of them may be conducted simultaneously or separately.

As the chemical removal method, a hydrolyzing method with use of an acid or an alkali is preferable in view of economic performance and operatability. Examples of the resins that are likely to be hydrolyzed with an acid or an alkali include: polyester, polycarbonate, and polyamide.

Preferred examples of the dissolution removal methods involving addition of a solvent which dissolves the eliminable resin include: a method in which a solvent is continuously fed to the mixture of the carbonizable resin and the eliminable resin to dissolve and remove the eliminable resin, or a method in which the eliminable resin is dissolved and removed in batch-wise mixing.

Specific examples of the eliminable resins suitable for the removal method involving addition of a solvent include: polyolefins such as polyethylene, polypropylene, and polystyrene; acrylic resins; methacrylic resins; polyvinylpyrrolidone; aliphatic polyesters; and polycarbonate. Among them, in view of solubility in a solvent, an amorphous resin is more preferable, and examples thereof include: polystyrene, methacrylic resin, and polycarbonate.

Examples of the removal method involving thermal decomposition of the eliminable resin into smaller molecules include: a method in which the mixture of the carbonizable resin and the eliminable resin is thermally decomposed under batch-wise heating, or a method in which the mixture of the carbonizable resin and the eliminable resin is thermally decomposed under heating while being continuously fed into a heating source.

The eliminable resin is preferably a resin that will be eliminated by thermal decomposition when the carbonizable resin is carbonized through heating in step 4 described later, and preferably a thermoplastic resin that does not undergo a significant chemical change during the infusibilization described later, and that has a carbonization yield of less than 10% after heating.

Specific examples of such eliminable resins include: polyolefins such as polyethylene, polypropylene, and polystyrene; acrylic resins; methacrylic resins; polyacetals; polyvinylpyrrolidone; aliphatic polyesters; aromatic polyesters; aliphatic polyamides; and polycarbonates. These may be used alone or used in a mixed state thereof.

In step 1, the carbonizable resin and the eliminable resin are miscibilized with each other to give a resin mixture (polymer alloy). The term "miscibilize" as used herein refers to creating a state in which the carbonizable resin and the eliminable resin are uniformly mixed at the molecular level by appropriately selecting conditions of a temperature and/or a solvent so that the phase-separated structure of the carbonizable resin and the eliminable resin is not observed under an optical microscope.

The carbonizable resin and the eliminable resin may be miscibilized by mixing the resins only with each other, or may be miscibilized by mixing the resins with a further added solvent.

Examples of the system in which multiple resins are miscible include: a system that exhibits the upper critical solution temperature (UCST) type phase diagram, in which the system has multiple phases at a low temperature but becomes single phase at a high temperature, or conversely, a system that exhibits the lower critical solution temperature (LCST) type phase diagram, in which the system has multiple phases at a high temperature but becomes single phase at a low temperature.

In particular, for a system in which at least one of the carbonizable resin and the eliminable resin is dissolved in a solvent, preferable examples thereof include a system in which a non-solvent penetration induces the phase separation described later.

The solvent to be added is not particularly limited. The absolute value of the difference between a solubility parameter (SP value), which is an indicator of solubility, of the solvent and the average value of the SP value of the carbonizable resin and the SP value of the eliminable resin is preferably 5.0 or less.

It is known that the solubility of the resins in the solvent increases as the absolute value of the difference between SP value of the solvent and the average value of the SP values of the resins decreases. Hence, the difference is preferably zero. On the other hand, the solubility decreases as the absolute value of the difference between SP value of the solvent and the average value of the SP values of the resins increases, and the carbonizable resin and the eliminable resin become difficult to be miscible. From these reasons, the absolute value of the difference between SP value of the solvent and the average value of the SP values of the resins is preferably 3.0 or less, and more preferably 2.0 or less.

Specific examples of the combinations of the carbonizable resin and the eliminable resin in miscible system with no solvents include: polyphenylene ether/polystyrene, polyphenylene ether/styrene-acrylonitrile copolymer, total aromatic polyester/polyethylene terephthalate, total aromatic polyester/polyethylene naphthalate, and total aromatic polyester/polycarbonate. When they are difficult to be miscible in view of their degree of polymerization and/or stereoregularity, it is preferable to conduct an appropriate copolymerization or chemical modification to miscibilize the combination of both resins.

Specific examples of the combinations of the carbonizable resin and the eliminable resin in miscible system with a solvent include: polyacrylonitrile/polyvinyl alcohol, polyacrylonitrile/polyvinylphenol, polyacrylonitrile/polyvinylpyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, and polyvinyl alcohol/starch. When they are difficult to be miscible in view of their degree of polymerization and/or stereoregularity, it is preferable to conduct an appropriate copolymerization or chemical modification to miscibilize the combination of both resins.

The method to mix the carbonizable resin and the eliminable resin is not limited, and there can be employed various types of known mixing methods that can mix them uniformly. Specific examples thereof include a method using a rotary mixer with a stirring blade, or a method using screw kneader extruder.

Moreover, the temperature at which the carbonizable resin and the eliminable resin are mixed (mixing temperature) is preferably equal to or higher than the temperature at which both the carbonizable resin and the eliminable resin soften. Note that, softening temperature may be appropriately selected as a melting point when the carbonizable resin or the eliminable resin is a crystalline polymer, or a glass transition point when the carbonizable resin or the eliminable resin is an amorphous resin. When the mixing temperature is equal to or higher than the temperature at which both the carbonizable resin and the eliminable resin soften, both resins become less viscose, which allows more efficient stirring and mixing. The upper limit of the mixing temperature is also not particularly limited, but is preferably 400° C. or below in view of obtainment of a porous carbon fiber with excellent quality by preventing the resins from being deteriorated due to thermal decomposition.

In step 1, it is preferable to mix 90 to 10% by weight of the eliminable resin to 10 to 90% by weight of the carbonizable resin. The mixing of 10% by weight or more of the carbonizable resin is preferable on the reason that it allows yield improvement and the retention of the porous carbon fiber after carbonization. On the other hand, the mixing of 90% by weight or less of the carbonizable resin is preferable on the reason that the eliminable resin can efficiently create voids.

Note that, any mixing ratio of the carbonizable resin to the eliminable resin can be selected in consideration of the miscibility of the respective resins. Specifically, the miscibility between resins generally decreases as the composition ratio becomes closer to 1 : 1. When a raw material system with low miscibility is selected, preferable embodiments thereof include an improvement of its miscibility with an increase or a decrease of the amount of carbonizable resin to bring its composition closer to the so-called partial composition.

It is also preferable to add a solvent at the time of mixing the carbonizable resin and the eliminable resin. Addition of a solvent makes the carbonizable resin and the eliminable resin less viscose, which facilitates molding and miscibilization of the carbonizable resin and the eliminable resin.

The solvent as referred to herein is not particularly limited, and may be any solvent that is a liquid at room temperature, and that is capable of dissolving and swelling at least one of the carbonizable resin and the eliminable resin. A solvent which dissolves both of the carbonizable resin and the eliminable resin is more preferable, because the miscibility between both of them can be increased.

In view of an enhancement of the miscibility between the carbonizable resin and the eliminable resin and an improvement of its fluidity by reducing their viscosities, the addition of the solvent is preferably 20% by weight or more based on the total weight of the carbonizable resin and the eliminable resin. On the other hand, in view of the cost associated with the solvent recovery and reuse, the addition of the solvent is preferably 90% by weight or less based on the total weight of the carbonizable resin and the eliminable resin.

When carbonization in step 4 is conducted through microwave heating, an additive that efficiently absorbs microwave is preferably contained in 0.01% by weight or more based on the total weight of the carbonizable resin and the burnt resin. Examples of the additives that efficiently absorb microwave include: graphite, silicon carbide, silicon nitride, carbon nanotube, carbon black, fullerene, graphene, metals, and metal oxides. These may be used alone or in combination of two or more thereof. Note that, in view of the efficiency of microwave absorption, it is preferable to appropriately adjust the frequency and the energy of the microwave to be emitted depending on the properties of these additives. In view of facilitating the molding of fibers in step 2, the additive preferably has an average particle diameter of 500 nm or less as determined by the particle size distribution measurement method using dynamic light scattering.

[Step 2] Molding/Phase Separation

Step 2 is a step of molding the resin mixture miscibilized in step1 into a fibrous form (spinning) and separating the resin mixture into multiple phases.

The method of molding the resin mixture in miscibilized state into a fibrous form is not particularly limited, and any spinning method can be appropriately selected depending on the phase separation method described later. When the resin mixture is a combination of thermoplastic resins, melt spinning can be conducted after the resins have been heated to a temperature equal to or higher than their softening temperatures. When the resin mixture contains a solvent, solution spinning such as dry spinning, dry wet spinning, or wet spinning can be appropriately selected.

Melt spinning is a method to mold a resin mixture that has been heated and melted (in flowing state) into a fibrous form by extruding from a spinneret with use of a kneader extruder or the like and then winding it up while cooling. Melt spinning process is less time consuming than solution spinning process and is excellent in productivity. Melt spinning is also preferable because low-cost manufacturing is feasible since the cost associated with process safety measures can be reduced as no volatilization of solvents occur in the process.

Solution spinning is a method in which a spinning dope, which contains a resin mixture prepared in advance and a solvent, is weighed and then extruded from a spinneret to mold it into a fibrous form. This method can precisely control the condition of the separated phases.

In particular, dry-wet spinning and wet spinning both using a coagulation bath are more preferable embodiments because in which the heat-induced phase separation, the non-solvent-induced phase separation, which will be discussed below, and the like can be appropriately combined to precisely control the condition of the separated phases of the precursor fiber for the porous carbon fiber.

The method of fibrous molding and separation of the carbonizable resin and the eliminable resin into multiple phases is not particularly limited. Examples thereof include, for example, a heat-induced phase separation method in which phase separation is induced by a temperature change; or a non-solvent-induced phase separation method in which phase separation is induced by addition of a non-solvent.

These phase separation methods can be applied alone or in combination thereof. Examples of the specific methods applied in combination include, for example, a method in which non-solvent-induced phase separation is generated through a coagulation bath and then heat-induced phase separation is generated through heating, a method in which both the non-solvent induced phase separation and the heat-induced phase separation are generated simultaneously by controlling the temperature in the coagulation bath, and a method in which the resins discharged from the spinneret are cooled to generate heat-induced phase separation and then brought into contact with a non-solvent.

Subsequently, the resins pass through the coagulation bath and then are dried and thereby a phase-separated structure is created and stabilized to obtain a fiber serving as a precursor for a porous carbon fiber. Examples of the coagulating liquid used herein include, but are not particularly limited to, water, ethanol, an aqueous salt solution, and a mixed solvent thereof with the solvent to be used in step 1.

Non-solvent-induced phase separation process can fabricate a precursor fiber for a porous carbon fiber having the opening of pores on the outer surface by suppressing the creation of a dense layer on the outer periphery of the fiber with use of a conjugate spinning method, in which, for example, when a spinning solution is discharged from an inner tube, a same solvent as in the spinning solution, a solution in which the eliminable resin is dissolved, or the like is simultaneously discharged from an outer tube.

[Step 3] Removal of Eliminable Resin

The precursor fiber for the porous carbon fiber obtained in step 2 is subjected to the step of removing the eliminable resin (step 3) at least one time point: prior to the step of carbonization (step 4); simultaneously with the step of carbonization (step 4); or after the step of carbonization (step 4). This means that the removing of the eliminable resin is described as "step 3" for the convenience of explanation, but in reality, step 3 needs not to be conducted after step 2 and prior to step 4, it may be conducted simultaneously with step 4, or conducted after step 4. Furthermore, it may be conducted simultaneously with the infusibilization described later.

The method to remove the eliminable resin is not particularly limited. Specific examples thereof include: a method in which the eliminable resin is chemically decomposed into smaller molecules with use of an acid, an alkali, an enzyme, or oxygen, and removed; a method in which the eliminable resin is dissolved and removed with a solvent that dissolves the eliminable resin; and a method in which the eliminable resin is decomposed with use of radiation such as electron beam, gamma ray, ultraviolet ray, and infrared ray, or heat, and removed.

In particular, when the eliminable resin can be removed by thermal decomposition, heat treatment can be conducted at a temperature at which 80% by weight or more of the eliminable resin is eliminated prior to the carbonization (step 4), or in the carbonization (step 4) or the infusibilization described later, the eliminable resin can be thermally decomposed, gasified and then removed. Because of the enhanced productivity, it is preferable to remove the eliminable resin by thermal decomposition and gasification simultaneously with heat treatment in the carbonization (step 4) or the infusibilization described later.

[Infusibilization]

The precursor fiber for the porous carbon fiber is preferably infusibilized at a stage following phase separation (step 2) or a stage prior to carbonization (step 4).

The method of infusibilization is not particularly limited, and a known method can be used. Specific methods thereof include: a method to cause oxidative cross-linking through heating in the presence of oxygen; a method to create a cross-linked structure by irradiation with high-energy ray such as electron beam and gamma ray; and a method to create a crosslinked structure by impregnation and mixing of a substance having a reactive group. Among them, a method to cause oxidative crosslinking through heating in the presence of oxygen is preferable because it can simplify the process and reduce the manufacturing cost. These methods may be used alone or used in combination, or each of them may be used simultaneously.

In the method to cause oxidative cross-linking through heating in the presence of oxygen, the heating temperature is preferably 150° C. or higher in view of the efficiency to proceed the cross-linking reaction, and is preferably 350° C. or below in view of the prevention of yield decrease resulting from the weight loss of the carbonizable resin which is thermally decomposed, combusted, etc.

The oxygen concentration in the infusibilization is not particularly limited, but it is preferable to feed a gas having an oxygen concentration of 18% by volume or more because it can reduce the manufacturing cost. Examples of the gas feeding method include, but are not particularly limited to, a method to directly feed air into the heating device; and a method to feed pure oxygen into the heating device via an oxygen cylinder or the like.

Examples of methods to create a cross-linked structure by irradiation with high-energy ray such as electron beam and gamma ray include: a method in which, using commercially available electron beam generator or gamma ray generator, the carbonizable resin is irradiated with electron beam or gamma ray and thereby cross-linking is induced.

In view of an efficient introduction of the crosslinked structure with use of irradiation, the lower limit of the irradiation intensity is preferably 1 kGy or more. In view of preventing the strength of the precursor fiber for the porous carbon fiber from being decreased due to the degrading into smaller molecules because of the main chain cleavages, the upper limit of the irradiation intensity is preferably 1,000 kGy or less.

Examples of methods to create a crosslinked structure by impregnation and mixing of a substance having a reactive group include: a method in which a low molecular weight compound having a reactive group is impregnated into the resin mixture and then heated or irradiated with high energy rays to proceed crosslinking reaction; and a method in which a low molecular weight compound having a reactive group is mixed in advance and then heated or irradiated with high energy rays to proceed crosslinking reaction.

[Step 4] Carbonization

Step 4 is a step in which the precursor fiber for the porous carbon fiber obtained in step 2, or the precursor fiber subjected to the removal of the eliminable resin and/or the infusibilization as needed is carbonized to obtain a porous carbon fiber.

In order to carbonize the precursor fiber for the porous carbon fiber, the carbonization in this step is preferably conducted through heating by heat conduction or microwave heating in an inert gas atmosphere. An inert gas described herein refers to a gas that is chemically inactive when heated, and specific examples thereof include helium, neon, nitrogen, argon, krypton, xenon, and carbon dioxide. Among them, nitrogen and/or argon is preferably used in view of economic performance.

The flow rate of the inert gas may be an amount that can sufficiently reduce the oxygen concentration in the heating device, and it is preferable to appropriately select an optimum value depending on the heating device size, the raw material feed, the heating temperature, and the like. The upper limit of the inert gas flow rate is not particularly limited, but is preferable to be appropriately adjusted depending on the temperature distribution or the heating device design in view of an economic performance and a controllability of the temperature variation in the heating device. Incidentally, it is more preferable to allow an adequate amount of the gas generated during carbonization to be released to the outside of the system because a porous carbon fiber having an excellent quality can be obtained. For this reason, the inert gas flow rate is preferably determined so that the concentration of the generated gas in the system becomes 3,000 ppm or less.

When carbonization is conducted through heat conduction (heating), the heating temperature is preferably 300° C. or higher, and more preferably 400° C. or higher. The upper limit of the heating temperature is not limited, but is preferably 1,500° C. or lower, in view of economic performance because the equipment needs no special processing. When the removal of the eliminable resin (step 3) as mentioned above is conducted simultaneously, heating temperature is preferably a temperature higher than the temperature at which the eliminable resin is thermally decomposed.

The carbonization through microwave irradiation is preferable in the point that burnt spots are less likely to occur and that the process is less time consuming than that of the carbonization through heating. A device to emit microwave is not limited, but is preferably a device which emits microwave uniformly so that no burnt spots are generated. Any frequency used in microwave heating can be selected within a range of 300 MHz to 300 GHz inclusive, and any output used in microwave heating can be selected within a range of 200 W to 1500 W inclusive. The internal temperature of the furnace during heating is preferably 300° C. or higher, and more preferably 400° C. or higher. The upper limit of the heating temperature is not limited, but is preferably 1,500° C. or below in view that abnormal discharge can be suppressed. When the removal of the eliminable resin (step 3) as mentioned above is conducted simultaneously, heating temperature is preferably a temperature higher than the temperature at which the eliminable resin is thermally decomposed.

In this step, the precursor fiber for the porous carbon fiber may be cut and then subjected to a batch-wise heating in a heating device, but the precursor fiber is more preferably subjected to continuous heating without cutting. Examples of the method of continuous heating include, but are not particularly limited to, a method of heat conduction heating and a method of microwave heating. These heating methods are preferably a method in which the precursor fiber for the porous carbon fiber is continuously supplied into and taken out from the heating device with use of a roller, a conveyor, or the like, because it can increase the productivity.

When batch-wise process is conducted in a heating device, the heating rate and the cooling rate are not limited, but is preferably 1° C./min or more because the productivity can be improved by the curtailment of the heating and cooling time. The upper limits of the heating rate and the cooling rate are not particularly limited, and can be appropriately adjusted within a range where defects such as cracks do not occur.

[Step 5] Surface Polishing of Porous Carbon Fiber

Step 5 is a step to polish the surface of the porous carbon fiber to equalize the carbonization progression degree R in the porous carbon fiber when burnt spots due to the carbonization causes a difference in the carbonization progression degree R in the porous carbon fiber obtained in step 4. Note that, when the AR of the porous carbon fiber after step 4 is 0.05 or less, step 5 can be omitted.

Examples of the polishing method include, but are not particularly limited to, a polishing method using an abrasive such as a grindstone, a slurry; or a polishing method using a particle beam such as an ion beam. Among them, ion beam polishing is preferable because of its high polishing speed and decreased amount of abrasive residues on the porous carbon fibers.

When the porous carbon fiber has a fibrous form, it is preferable to install an ion gun at such a position from which the ion beam is emitted in the fiber axis direction, and it is preferable to use one or more of ion guns in view of polishing efficiency. As used herein, "the position from which the ion beam is emitted" may be any position other than the position which completely coincides with the fiber axis based on the fiber axis of the porous carbon fiber to be treated. In view of the efficiency of the ion beam irradiation, it is preferable to install the ion gun within the range of ±60° from the position where the ion beam is perpendicular to the fiber axis.

The polishing depth from the porous carbon fiber surface is preferably 1% or more, and more preferably 2% or more based on the fiber diameter. The polishing depth is preferably 20% or less, in view of the retainment of mechanical strength and the curtailment of polishing time.

EXAMPLE (Carbonization Progression Degree)

A hollow porous carbon fiber was cut at 5 points to give 5 samples. The Raman measurement was conducted using Raman microscope (RAMAN touch VIS-ICS-S; manufactured by Nanophoton Corporation) under the conditions: laser wavelength of 532 nm (ND filter 139); laser power density of $1 \times 10^4$ W/cm; the diffraction grating of 300 gr/mm; the magnification of an objective lens of 50X; the exposure time of 30 s; the number of accumulations of 3; and the measurement mode of Point. The Ra value was calculated from the average value of the R values of the carbonization progression degree for the outer surfaces of the five samples, and the Rb value was calculated from the average value of the maximum values for the five samples determined as follows: on the cross section of the porous carbon fiber, two points lying on the outer surface and forming the largest distance were connected with a straight line to give a line segment; from this line segment, a length corresponding to the distance on this straight line passing through the hollow part was subtracted, and resultant length was quartered by three points.

(Simplified Evaluation for Durability)

A hollow porous carbon fiber was bent with a bend radius of 2 cm, from which 10 samples were fabricated by cutting out segments each with a length of 3 cm at the locations where the compression and tensile stress were applied in bending. The inside structure of each sample was observed with X-ray computed tomography (TOSCANER-32300 pFD) adjusted to a resolution of 5 μm. If any of the 10 samples was found to have any detachment or any defect inside, evaluation was "Defective", if all samples were found to be free from detachments or defects, evaluation was "Good".

Example 1

Polyacrylonitrile (PAN) (MW 150,000), polyvinylpyrrolidone (PVP) (MW 40,000), and dimethyl sulfoxide (DMSO) as a solvent were added to a separable flask and mixed so as to have the ratio of PAN to PVP of 1:1 and the polymer concentration of 15% by weight, and stirred and refluxed to prepare a uniform and transparent solution.

The resultant polymer solution was discharged from the outer tube of the core-sheath type double spinneret, and the DMSO aqueous solution was simultaneously discharged from the inner tube of the double spinneret, then led to a mixture bath containing water and DMSO, and wound up on a roller to give a hollow filamentous PAN-based precursor fiber. The resultant PAN-based precursor fiber was translucent and was phase-separated. The resultant PAN-based precursor fiber was washed with water before drying.

The precursor fiber was then infusibilized at 260° C. in an air atmosphere to fabricate an infusibilized fiber.

Subsequently, the PAN-based precursor fiber as the infusibilized fiber, was heat-treated under an end temperature of 600° C. in a nitrogen atmosphere to fabricate a porous carbon fiber.

The entire outer surface of the resultant porous carbon fiber was polished to the depth of 5 μm from the outer surface with an ion beam.

Example 2

A porous carbon fiber was fabricated by the same method as in Example 1 except that the carbonization temperature was 800° C.

Example 3

A porous carbon fiber was fabricated by the same method as in Example 1 except that the carbonization temperature was 1000° C.

Example 4

A porous carbon fiber was fabricated by the same method as in Example 1 except that the polymer solution was discharged from a spinneret with a round pore to give a solid PAN-based precursor fiber.

Example 5

Polyacrylonitrile (PAN) (MW 150,000), polyvinylpyrrolidone (PVP) (MW 40,000), and dimethyl sulfoxide (DMSO) as a solvent were added to a separable flask and mixed so that the ratio of PAN to PVP became 1:1 and the polymer concentration became 15% by weight, and then silicon nitride was added so that its concentration became 0.05% by weight, and then stirred and reflexed to prepare a uniform solution.

Using the resultant polymer solution, an infusibilized fiber was fabricated by the same method as in Example 1.

Subsequently, the PAN-based precursor fiber as the infusibilized fiber, was heated with microwave at a frequency of 2.45 GHz and an output of 500 W in a nitrogen atmosphere to fabricate a porous carbon fiber.

Comparative Example 1

A porous carbon fiber was fabricated by the same method as in Example 1 without conducting ion beam polishing.

Table 1 shows the $R_{ave}$, ΔR values of the porous carbon fibers fabricated in Examples and Comparative Example, and the results of the simplified evaluation for durability.

TABLE 1

| | Infusibilization Infusibilization temperature | Carbonization Carbonization temperature | Polishing Ion beam | Carbonization Progression Degree $R_{ave}$ | ΔR | Simplified Evaluation for Durability |
|---|---|---|---|---|---|---|
| Example 1 | 240° C. | 600° C. | Done | 1.592 | 0.01 | Good |
| Example 2 | 240° C. | 800° C. | Done | 1.453 | 0.02 | Good |
| Example 3 | 240° C. | 1000° C. | Done | 1.089 | 0.02 | Good |
| Example 4 | 240° C. | 600° C. | Done | 1.566 | 0.04 | Good |
| Example 5 | 240° C. | Microwave heating | None | 1.433 | 0.01 | Good |
| Comparative example 1 | 240° C. | 600° C. | None | 1.636 | 0.11 | Defective |

DESCRIPTION OF REFERENCE SIGNS

A1, A2: Two points that lie on the outer surface and form the largest distance between them.

A1, A3: Two points that lie on the outer surface and not form the largest distance between them.

B1, B2, B3: Three points quartering the straight line segment A1A2.

C1, C2, C3: Three points that quarter the straight line segment obtained by subtracting the portion passing through the hollow part from the line segment A1A2.

D: The portion passing through the hollow part

E: Hollow part

The invention claimed is:

1. A porous carbon fiber having a bicontinuous porous structure, wherein
   the average value $R_{ave}$ of the R value of the outer surface and the R value of the inside is 1.0 or more and 1.8 or less,
   the absolute value ΔR of the difference between the R value of the outer surface and the R value of the inside is 0.05 or less, and
   R value is a carbonization progression degree calculated from a Raman spectrum in accordance with the following formula:
   R value=(intensity of scattering spectrum at 1360 cm$^{-1}$)/(intensity of scattering spectrum at 1600 cm$^{-1}$).

2. The porous carbon fiber according to claim 1, wherein the bicontinuous porous structure has a structural period.

3. The porous carbon fiber according to claim 2, wherein the structural period is 0.002 μm or more and 20 μm or less.

4. The porous carbon fiber according to claim 1, wherein a precursor of the porous carbon fiber is polyacrylonitrile or an aromatic polyimide.

5. The porous carbon fiber according to claim 1, wherein a fiber diameter of the porous carbon fiber is 0.1 μm or more and 10,000 μm or less.

6. The porous carbon fiber according to claim 5, wherein the fiber diameter of the porous carbon fiber is 20 μm or more and 10,000 μm or less.

7. The porous carbon fiber according to claim 1, wherein the bicontinuous porous structure has an opening of pores on the outer surface.

8. The porous carbon fiber according to claim 7, wherein the average opening diameter of the pores on the outer surface is 2 nm or more and 5000 nm or less.

9. The porous carbon fiber according to claim 1, wherein the porous carbon fiber is a hollow fiber with a hollow part.

10. A fluid separation membrane, using the porous carbon fiber according to claim 1 as a support thereof.

11. A fluid separation membrane, essentially comprising the porous carbon fiber according to claim 1.

* * * * *